UNITED STATES PATENT OFFICE.

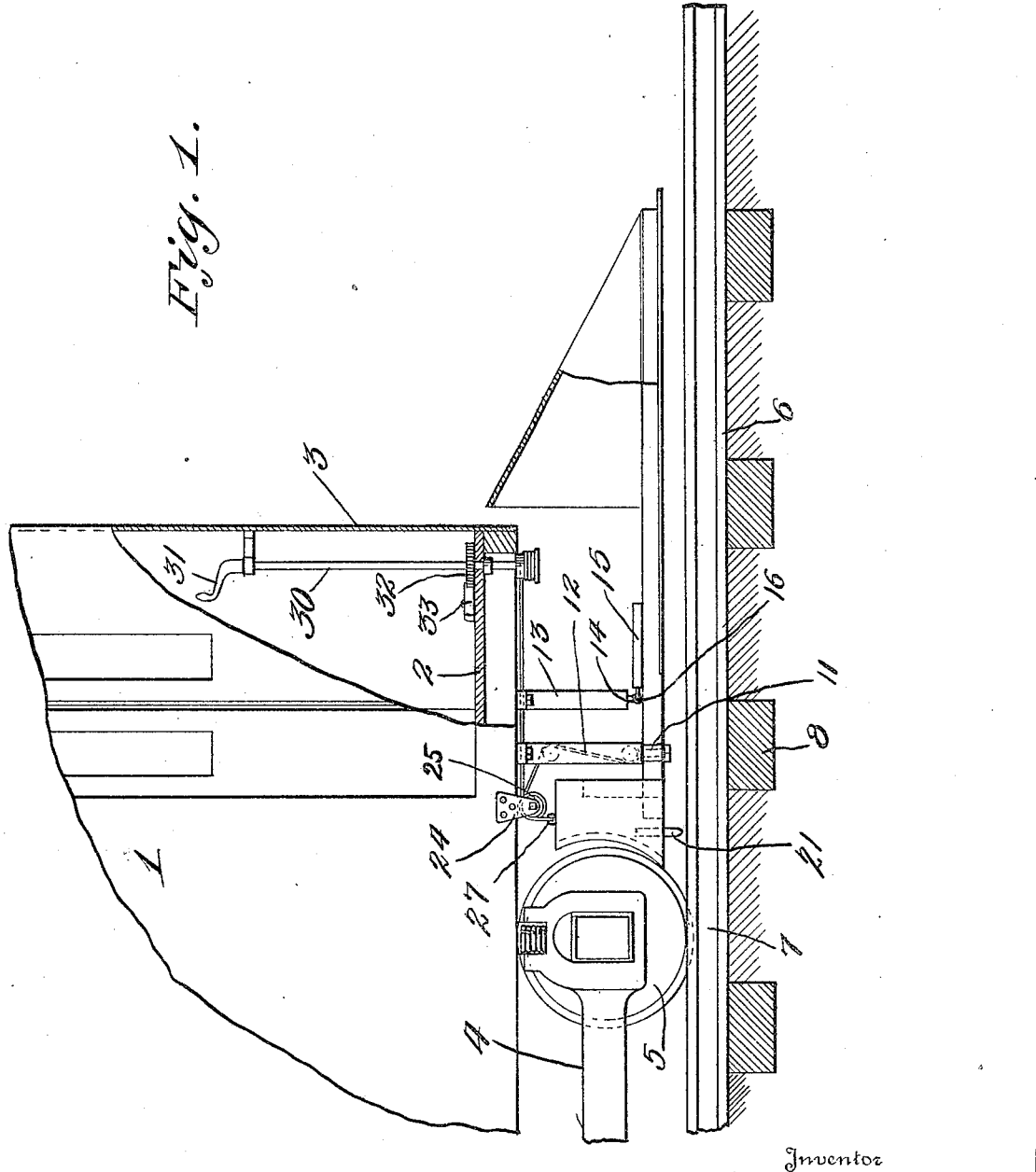

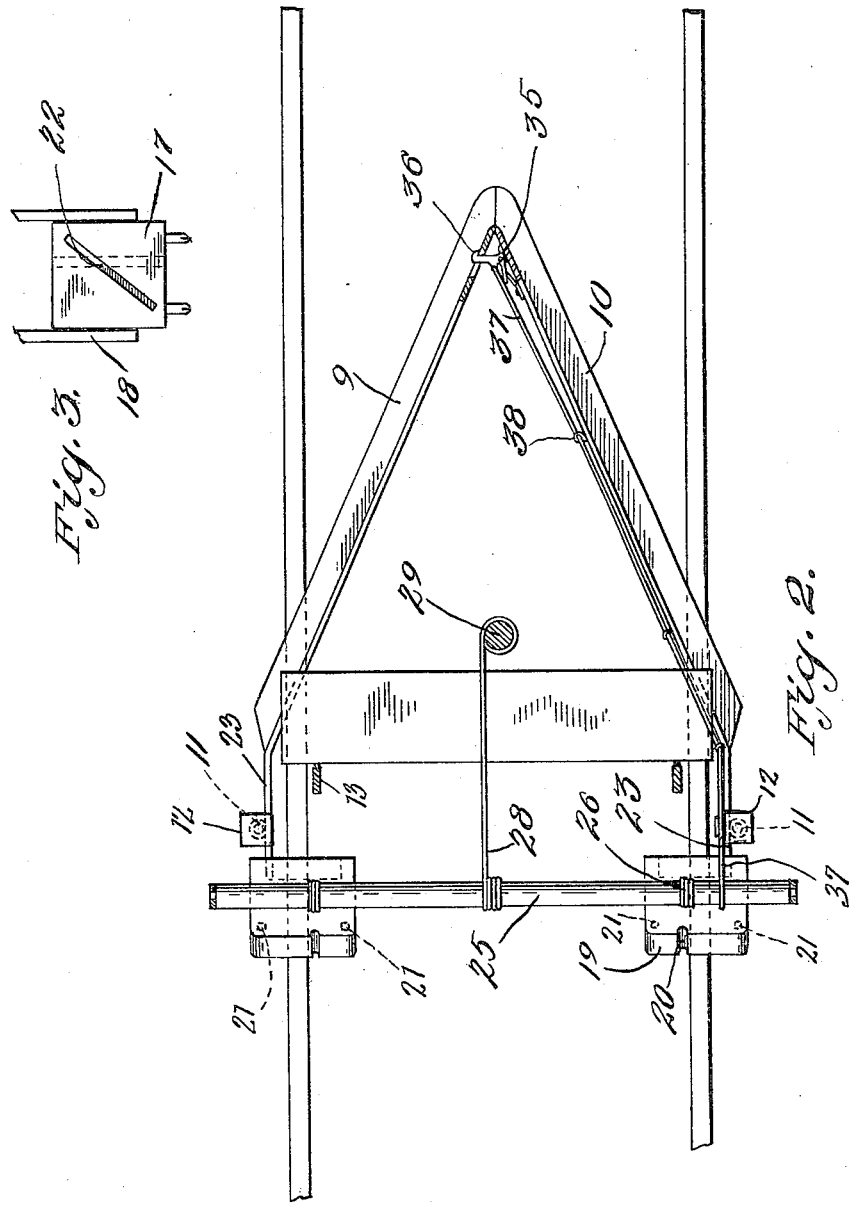

THOMAS W. BUSH, OF COLQUITT, GEORGIA.

COMBINED CAR FENDER AND BRAKE.

1,136,586.

Specification of Letters Patent. Patented Apr. 20, 1915.

Application filed April 14, 1914. Serial No. 831,817.

*To all whom it may concern:*

Be it known that I, THOMAS W. BUSH, a citizen of the United States, residing at Colquitt, in the county of Miller and State of Georgia, have invented certain new and useful Improvements in Combined Car Fender and Brakes, of which the following is a specification.

This invention relates to new and useful improvements in combined car fender and brakes, and has for its principal object to provide a fender and chock block which is particularly adapted for use on interurban and street railway cars.

Another object of the invention is to provide a fender having means attached thereto which will remove the object from the track without injuring the same.

Still another object of the invention is to provide a means to automatically return the fender to its normal position after it has been tripped.

A further object of the invention is to provide a means for releasing the fender to permit the same to throw the object laterally off the track.

With these and other objects in view, the invention consists in the novel combination and arrangement of parts which will be fully set forth in the following specification and accompanying drawings, in which, Figure 1 is a side view of a fragment of a car showing this attachment as it would appear when applied thereto, said car having portions thereof broken away to clearly illustrate the construction of the attachment, Fig. 2 is a top plan view of the attachment with the car removed, and Fig. 3 is a front view in elevation of one of the chock-blocks.

Referring now to the drawings by characters of reference, the numeral 1 designates as an entirety the usual car body provided with the platform 2 and dashboard 3. The usual truck, designated generally by the numeral 4, is mounted on the car in the ordinary way and carries the wheels 5. The track is designated generally by the numeral 6, and comprises the rails 7 and ties 8, as will be clearly seen upon referring to the drawings.

The attachment, which is best illustrated in Fig. 2, comprises a pair of arms 9 and 10, which are pivoted as at 11 to a depending bracket 12 which is carried by the frame of the car 1. These arms 9 and 10 are pivotally mounted as at 11 to the frame of the car and said arms are arranged so that they swing outwardly on their pivot in order, so that a person or article upon the track will be pushed to the side thereof and beyond the line of the truck of the car thereby removing them from danger. These arms are controlled by means of the mechanism which will be more fully hereinafter described and set forth in the claims.

A suitable depending bracket 13 is secured to the car frame in any suitable manner and is provided at its free end with the depending lug 14 to which the plate 15 is hingedly secured as at 16. The free edge of this plate is arranged to rest on the arms 9 and 10 as shown in Fig. 2 when in its normal position, and when the arms are swung open this plate will swing downwardly so that its free edge will rest on the track hereinbefore mentioned.

The controlling mechanism for the arms 9 and 10 comprises a pair of blocks 17 which are slidably mounted in the brackets 18 which are inturn carried by the frame of the car 1 and are arranged to hold the blocks in the proper position. These blocks 17 are provided with the concave rear faces 19 extending through the grooves 20 which are arranged to receive the flanges of the car wheels when the chock-blocks are thrown into operation. Secured to the chock-blocks in any suitable manner and depending therefrom, are provided a plurality of spikes 21 which are arranged to enter the ground when the device is operated to hold the chock-blocks and prevent the same from sliding along the track. A suitable angularly extending groove 22 is formed in the front face of each of the chock-blocks and is arranged to receive the end of the angular extension 23 which is formed on each of the arms 9 and 10 as clearly shown in Figs. 1 and 2.

A suitable bracket 24 is secured to the car frame and is provided with journal bearings in which the roller 25 is rotatably mounted. This roller 25 is arranged to receive the flexible connections 26 which are connected to each of the chock-blocks as at 27, and it will be evident that when the roller is operated the blocks will be raised or lowered according to the direction in which the roller is rotated. Secured to the roller intermediate its ends is provided the flexible member 28, the opposite terminal of which is connected to the winding drum 29 carried by the shaft 30 to which the hand crank 31 is removably secured. A suitable ratchet wheel 32 is secured to the shaft 30 and is arranged to coöperate with the pawl 33 which is arranged to limit the movement of the shaft and also hold the same against movement after the flexible member 28 has been wound on the drum 29.

The releasing mechanism for the arms 9 and 10 preferably comprises the catch designated by the numeral 34 which is pivoted to one of the arms as at 35 and is arranged to extend through an aperture formed in the coöperating arm. This catch member 34 is provided with the enlarged head 36 which forms the shoulder to engage the walls of the aperture and prevent the arms 9 and 10 from swinging outwardly until the catch member is released. Secured to the catch member is a flexible connection which is supported to the frame by means of the rings or loops 38. This flexible connection is arranged to be secured to the roller or winding drum 35 to release the latch when the said drum is first set in motion.

It will be apparent from the foregoing that in use when an object or person is seen on the track, the car approaches the same until the arms 9 and 10 come into contact therewith at which time the pawl 33 is released which will permit the flexible connection 28 wound on the drum 29, to unwind therefrom and thereby set the drum 25 in rotation, thus permitting the flexible member 26 to unwind from the drum 25 and allow the chock-blocks to descend against the rail, and at the same time engage the surface of the ground in such a position that the wheels of the car will frictionally engage the concave surfaces of the chock-blocks and be held against rotation. Simultaneously with the downward movement of the chock-blocks, the arms 9 and 10 will swing outwardly through the action of the cam slot 32 which engages the inner ends of the arms 9 and 10. After the mechanism has been tripped and it is desired to return the same to its normal position, the crank lever 31 is placed in position on the rod 30 and upon rotating the said rod it will be evident that the flexible member 28 will be rewound on the drum 29, thus causing the same to unwind from the drum 25 and set said drum in motion which will raise the blocks 17 to their normal position and simultaneously through the action of the cam slot 22 and close the arms until the latch 34 hereinbefore described holds said arms and prevents accidental movement.

While in the foregoing there has been shown and described the preferred embodiment of this invention, it is to be understood that such changes may be made in the combination and arrangement of parts as will fall within the spirit and scope of the invention as defined in the appended claims.

Having thus described my invention, I claim:

1. In a device of the character described, the combination with a car including a frame, a truck carried by the frame, and wheels carried by the truck, of a fender comprising a pair of laterally swinging arms, chock blocks supported on the car frame, means connecting the chock blocks and the arms to actuate the same and cause said arms to swing outwardly when the chock blocks descend, and means controlled by the operator of the car to release the mechanism and thereby set the device in operation.

2. In a device of the character described the combination with a car including a frame, a truck, and wheels carried by the truck, of a fender, said fender comprising a pair of arms secured to the frame, of the car and arranged to swing laterally, chock blocks vertically slidable with relation to the car frame, means carried by the chock blocks to cause the arms to swing laterally when said blocks descend, a plate hingedly supported on the frame, the free edge of said plate being arranged to swing downwardly to engage the car track when the device is operated, and means to control the operation of the device.

3. In a device of the character described, the combination with a car including a frame, a truck, and wheels carried by the truck, of a pair of arms hingedly secured to the car frame, said arms being arranged to swing laterally, a catch at the free ends of the arms to hold the same against movement, a pair of chock blocks adapted to descend against the rail and frictionally engage the car wheels, a winding drum controlling the operation of the chock blocks, means carried by the chock blocks and adapted to control the operation of the arms, a flexible member connected to the latch and the winding drum whereby when the winding drum is turned, the latch will be released, means to control the operation of the mechanism, and means to raise the same to its normal position.

4. In a device of the character described the combination with a car including a frame, a truck, and wheels carried by the truck, of a fender comprising a pair of pivoted arms arranged to swing laterally, a plate pivoted to the car frame, the free edge of said plate resting on the arms and adapted to descend against the rails when the arms are opened, chock blocks vertically slidable with relation to the car frame, means carried by the chock blocks to actuate the arms, means to slide the chock blocks vertically, a catch carried by the free ends of the arms and adapted to hold the same together, means connected to the catch to release the same automatically when the mechanism is set in motion, and means to reset the device.

In testimony whereof I affix my signature in presence of two witnesses.

THOMAS W. BUSH.

Witnesses:
H. S. HARRELL,
J. M. WATSON.

Copies of this patent may be obtained for five cents each, by addressing the "Commissioner of Patents, Washington, D. C."